(12) United States Patent
Taurand

(10) Patent No.: US 7,135,847 B2
(45) Date of Patent: Nov. 14, 2006

(54) SERIAL CONNECTED LOW-LOSS SYNCHRONOUSLY SWITCHABLE VOLTAGE CHOPPER

(75) Inventor: Christophe Taurand, Valence (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/544,219

(22) PCT Filed: Jan. 16, 2004

(86) PCT No.: PCT/FR2004/000091

§ 371 (c)(1),
(2), (4) Date: Aug. 2, 2005

(87) PCT Pub. No.: WO2004/093305
PCT Pub. Date: Oct. 28, 2004

(65) Prior Publication Data
US 2006/0139021 A1    Jun. 29, 2006

(30) Foreign Application Priority Data
Mar. 18, 2003 (FR) .................................. 03 03305

(51) Int. Cl.
*G05F 1/40* (2006.01)
*H02M 3/06* (2006.01)
(52) U.S. Cl. ...................... 323/290; 323/225; 323/259; 323/271; 323/288; 363/62
(58) Field of Classification Search .................. 363/62, 363/140; 323/222, 224, 225, 259, 271, 282, 323/284, 285, 288, 290
See application file for complete search history.

(56) References Cited

U.S. PATENT DOCUMENTS

| | | | | |
|---|---|---|---|---|
| 4,654,769 | A | * | 3/1987 | Middlebrook ................. 363/62 |
| 5,357,419 | A | * | 10/1994 | Limpaecher ................. 363/140 |
| 6,023,154 | A | * | 2/2000 | Martinez ..................... 323/282 |
| 6,304,065 | B1 | * | 10/2001 | Wittenbreder ............... 323/225 |
| 6,437,999 | B1 | * | 8/2002 | Wittenbreder ................ 363/39 |

FOREIGN PATENT DOCUMENTS

JP          03 235657      * 10/1991

\* cited by examiner

*Primary Examiner*—Jessica Han
(74) *Attorney, Agent, or Firm*—Lowe Hauptman & Berner, LLP

(57) ABSTRACT

The invention relates to a buck converter comprising: a pair P_0 of switches SB, SH in series and connected to an input terminal B of the converter by the switch SB, K other additional pairs P_1, P_2, . . . , P_i, . . . P_K-1, P_K of switches in series between another input terminal A and the switch SH of the pair P_0, with i=1, 2, . . . K-1, K, the two switches of the same additional pair P_i are connected in series via an energy recovery inductor Lr_i; K input groups, Gin_1, Gin_2, . . . Gin_i, . . . Gin_K-1, Gin_K, of Ni capacitors C each in series; K output groups, Gout_1, Gout_2, . . . Gout_i, . . . Gout_K-1, Gout_K, of Mi capacitors C each in series. The switches P_0 and the K additional pairs are simultaneously controlled by first and second complementary control signals.

20 Claims, 10 Drawing Sheets

SERIAL CONNECTED LOW-LOSS SYNCHRONOUSLY SWITCHABLE VOLTAGE CHOPPER

CROSS-REFERENCE TO RELATED APPLICATIONS

The present Application is based on International Application No. PCT/FR2004/000091, filed on Jan. 16, 2004, which in turn corresponds to FR 03/03305 filed on Mar. 18, 2003, and priority is hereby claimed under 35 USC §119 based on these applications. Each of these applications are hereby incorporated by reference in their entirety into the present application.

FIELD OF THE INVENTION

The present invention relates to a buck converter that, from a DC power supply voltage, allows another DC voltage of lower value to be obtained.

BACKGROUND OF THE INVENTION

New electronic components are being powered with lower and lower voltages (currently 2.5 V and 1.8 V, and soon probably 1.2 V and 0.8 V) and the power requirements, at very low voltages, are increasing and becoming more important with respect to the conventional voltages +/−15 V and +5 V.

The currents drawn are becoming increasingly large since the power consumed by users is still the same or is increasing (capability for larger number of functions).

Voltages below 3.3 V are not distributed and are installed directly on the user boards. The power supply is being displaced as close as possible to the users.

This tendency obliges power supply manufacturers to produce converters generating ever greater ratios between input voltage and output voltage.

The structures used are generally pulse-mode converters that are not isolated in order to maintain high efficiencies and converters with low dimensions. It is difficult for these converters, with a structure of the step-down type, to achieve a transformation ratio greater than 10 with efficiencies greater than 90%.

In order to satisfy the demands of the market for higher levels of integration, these new converters must be deliverable within smaller and smaller surface areas and hence with increasingly higher efficiencies so as not to increase the size of the power dissipators.

The buck converter is one of the various converter structures.

FIG. 1a shows a functional circuit diagram of a buck converter.

The circuit in FIG. 1a is supplied by an input DC voltage Vin and delivers an output voltage Vout onto a load Rout in parallel with a capacitor Cout. A switch 10 allows either the positive potential of the input voltage Vin or the negative potential to be applied, for respective times Ton and Toff, to a terminal of an output inductor Lout that is connected by its other terminal to one of the load resistance terminals Rout. FIG. 1b shows the closed time Ton and the open time Toff of the switch 10. The other terminal of the load resistance Rout is connected to the negative potential of the input voltage Vin. It will be assumed in the following that the negative potential of Vin is 0 volts.

The diagrams in FIGS. 1c, 1d and 1e show the operational principle of the buck converter.

It is assumed that the switch 10 is switched with a frequency of period T, with T=Ton+Toff (see FIG. 1C). The period T can be a constant or variable value.

The voltage Vl across the terminals of the inductor Lout is:

Vl=Vin−Vout, during the time Ton and
Vl=−Vout, during the time Toff.

The mean voltage Vm of the output voltage Vout across the terminals of the resistance Rout will therefore be in the range between Vin and 0 volts depending on the duty cycle Toff/T and will be given by Vm=(Ton/T).Vin.

The mean value Vm of the voltage Vout is constant. The current Ilout in the inductor Lout takes the form of ramps during the times Ton and Toff. A diode D ensures the continuity of the current in the inductor during the switching operations.

In the diagram in FIG. 1c the case of Ton=T/2 and hence Vout=Vin/2 is shown.

The diagrams in FIGS. 1d and 1e respectively show two values of mean voltage Vm1 and Vm2 across the terminals of the load resistance Rout for two values of the time Ton:

in the diagram in FIG. 1d: Ton/T=0.9 and,
in the diagram in FIG. 1e: Ton/T=0.1.

In other words, when Ton/T is small, the energy supplied by the power source, during the short time Ton, is small, producing a low mean voltage across the terminals of the load. On the other hand, when Ton is close to the period T, the load is virtually continuously connected to the power source, the mean output voltage is close to the DC input voltage.

In another type of operation of the buck converter, the time Ton is kept constant and the switching frequency, in other words the switching period T, is changed so that the ratio Ton/T is made to vary.

In practice, the switches are formed by two semiconductors in series, for example two MOS switches controlled by complementary signals at the frequency 1/T.

The buck converters of the prior art nevertheless have limitations. Indeed, a duty cycle Ton/T of 0.1 is the minimum that can currently be obtained with an acceptable performance in terms of efficiency and reliability. However, when it is desired to obtain an output voltage lower than one tenth of the input voltage, the conduction time Ton of the semiconductor supplying the energy to the load becomes very short and the switches become very difficult to control. In addition, if the output voltage decreases, for a given power delivered to the load, the currents in the semiconductors become large, at the limits of their capabilities, with a loss of efficiency of the converter.

Another means for obtaining a ratio between the input voltage and the output voltage that is much higher than 10 consists in forming a voltage step-down device comprising two cascaded converters. In this device, the output voltage of a first converter is applied to the input of a second converter. Thus, much higher ratios between the input voltage and the output voltage of the device can be obtained than those obtained by a single converter. Nevertheless, such a step-down device comprising two cascaded converters exhibits a globally lower efficiency than that of a single converter and a higher cost of production.

SUMMARY OF THE INVENTION

In order to overcome the problems of the buck converters of the prior art, the invention proposes a buck converter comprising:

a pair of input terminals A and B for connecting an input DC voltage Vin across these two terminals, the potential of the terminal A being higher than the potential of the terminal B;

a pair P_0 of switches SB, SH in series and connected to the input terminal B by the switch SB, each switch SB, SH comprising a control input so that, simultaneously, one is set in a conducting state by the application of a first control signal at its control input, and the other in an isolating state by the application of a second control signal, complementary to the first control signal, at its control input;

a pair of output terminals C and D for supplying a load Rout with an output voltage Vout, the output terminal D being connected to the input terminal B and the output terminal C to the connection point between the two switches SB and SH in series via a filter inductor Lout, characterized in that it comprises:

K other additional pairs P_1, P_2, . . . P_i, . . . , P_K-1, P_K of switches in series between the input terminal A and the switch SH of the pair P_0, with i=1, 2, . . . K-1, K, the two switches of the same additional pair P_i being connected in series via an energy recovery inductor Lr_i;

K input groups, Gin_1, Gin_2, . . . Gin_i, . . . Gin_K-1, Gin_K, of Ni capacitors C in series, each of the same value, with i=1, 2, . . . K-1, K and Ni=(K+1)-i, the electrode of the capacitors of one of the two ends of each input group Gin_1, Gin_2, . . . Gin_i, . . . Gin_K-1, Gin_K being connected to the input terminal A, at least the electrode of the capacitors of each of the other ends of the input groups Gin_1, Gin_2, . . . Gin_i, . . . Gin_K-1, Gin_K being connected to the connection point between two pairs of consecutive switches P_(i-1) and P_i, respectively;

K output groups, Gout_1, Gout_2, . . . Gout_i, . . . Gout_K-1, Gout_K, of Mi capacitors C in series, each of the same value, with i=1, 2, K and Mi=i, the electrode of the capacitors of one of the two ends of each output group Gout_1, Gout_2, . . . Gout_i, . . . Gout_K-1, Gout_K being connected to the common point between the two switches of the pair P_0, at least the electrode of the capacitors of each of the other ends of the output groups Gout_1, Gout_2, . . . Gout_i, . . . Gout_K being connected to the common point between each switch SH_i and the recovery inductor Lr_i of the corresponding pair P_i of the same rank i, respectively, in that the switches of these other K additional pairs are simultaneously controlled by the first and second complementary control signals forming, when the switch SB of the pair P_0 connected to the terminal B is set in the conducting state for a time Toff, a first network of capacitors connected between the terminal A and the terminal B, comprising the groups of input capacitors in series with the groups of output capacitors such that a group of input capacitors Gin_i is in series, via its respective energy recovery inductor Lr_i, with its respective group of output capacitors Gout_i, and in that, when the switch SB of the pair P_0 connected to the input terminal B is set in the isolating state, SH being set in the conducting state, for a time Ton, these other K pairs of switches form a second network of capacitors, connected between the terminal A and the output filter inductor Lout, comprising the input group Gin_1 in parallel with the output group Gout_K, in parallel with input capacitor groups in series with output capacitor groups such that an input capacitor group Gin_i is in series with an output capacitor group Gout_(i-1).

The voltage Vout at the output of the converter depends on the duty cycle Ton/T, and since the network capacitors C have the same value, the voltage Vout is given by the equation:

Vout=Vin.(Ton/T).1/(K+1) with a chopping frequency of the input voltage Vin of period T=Ton+Toff.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be better understood with the aid of exemplary embodiments according to the invention, with reference to the indexed drawings, in which:

FIGS. 1b, 1c, 1d and 1e show control state diagrams of the converter in FIG. 1a;

DETAILED DESCRIPTION OF THE INVENTION

Figure 1A:
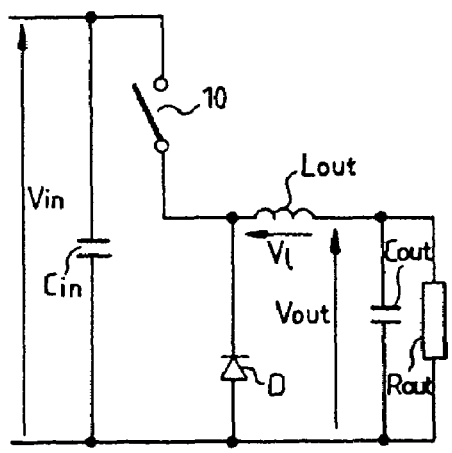
FIG. 1a, already described above, shows a functional circuit diagram of a voltage step-down buck converter.
Figure 1B:
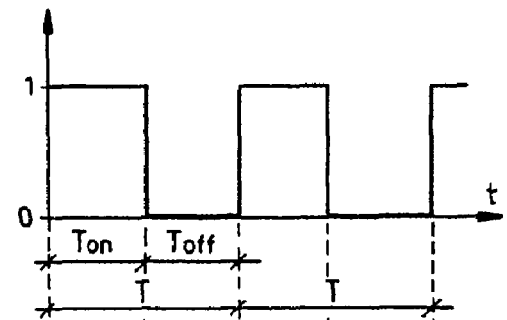
Figure 1C:
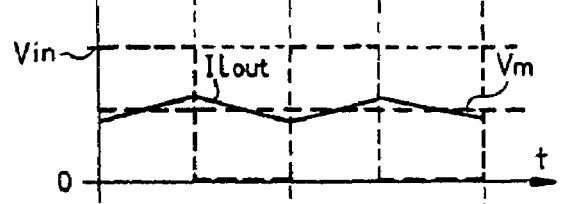
Figure 1D:
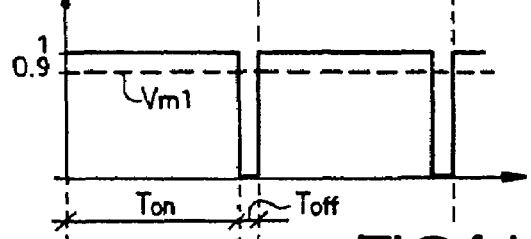
Figure 1E:
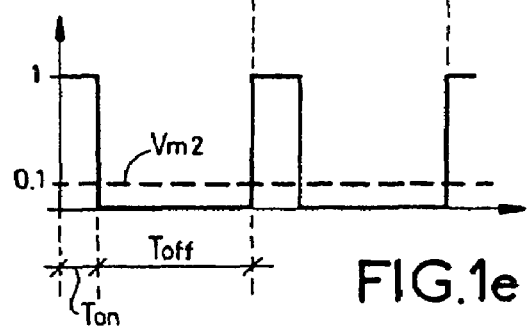
Figure 2:
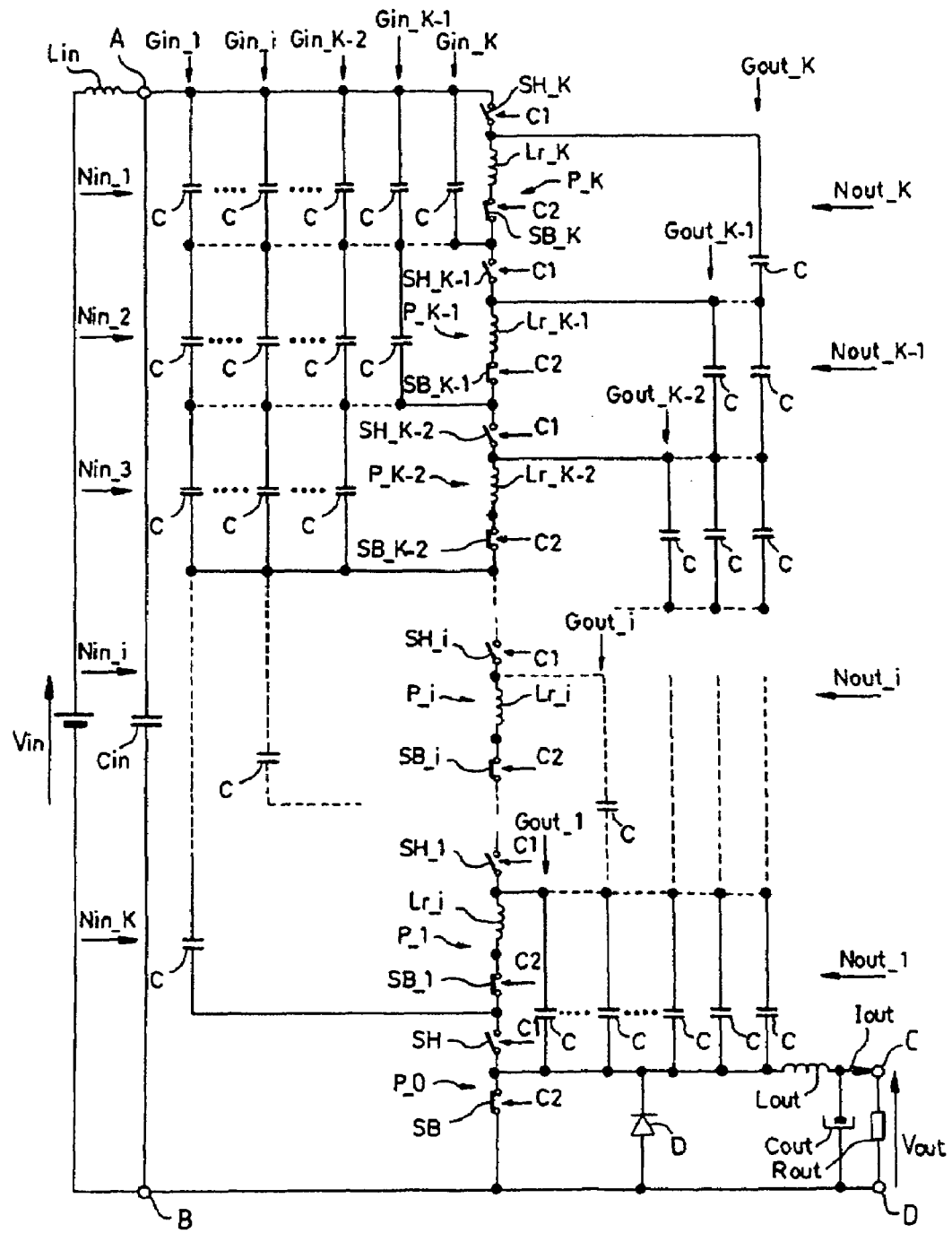
FIG. 2 shows the general structure of the converter according to the invention comprising K additional pairs of switches.

FIG. 2 shows the general structure of the converter according to the invention comprising K additional pairs of switches. The converter in FIG. 2 also comprises the current return diode D across the terminals of the switch SB whose anode is connected on the side of the terminals B and D, and an output filter capacitor Cout in parallel with the load Rout between the output terminals C and D.

In the general structure of the converter according to the invention in FIG. 2, the voltages Vc across the terminals of the capacitors of the input groups or of the output groups have the same DC value, thus the capacitors situated at the same potential level can be connected together.

Figure 3:
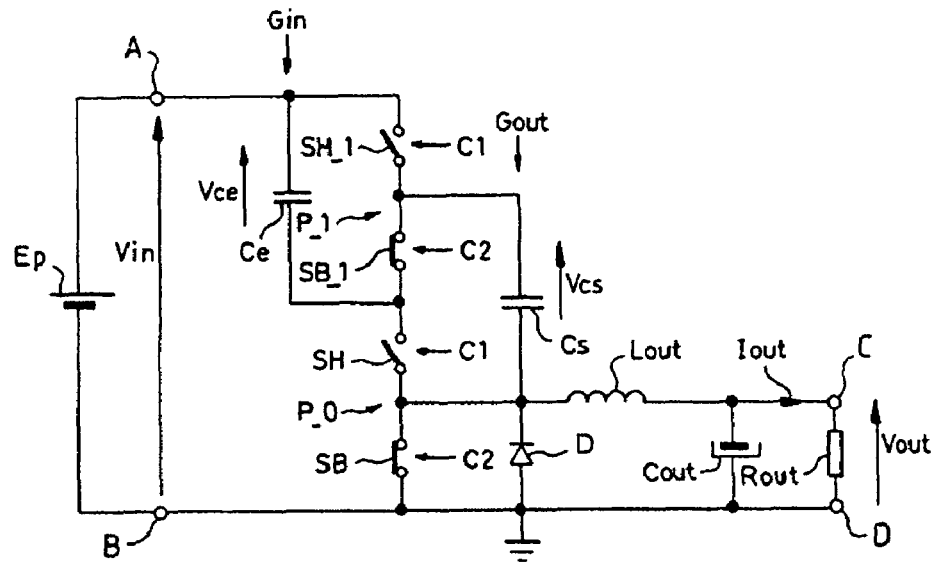
FIG. 3 shows a structure of a buck converter comprising two pairs of switches without the recovery inductors Lr_i.

In order to explain the improvement in the efficiency of the buck converter according to the invention brought about by the recovery inductors Lr_i, connected between the two switches of each of the additional pairs, in a first step of this explanation, FIG. 3 shows a buck converter structure comprising two pairs of switches without the recovery inductors Lr_i, the switches of each pair being, in this case, directly connected in series, the power supply voltage Vin being assumed to come from an ideal generator Ep whose voltage is independent of the current drawn.

The converter in FIG. 3 comprises two pairs P_0 and P_1, each of the pairs having two switches connected in series, the switches SB, SH for the pair P_0 and the switches SB_1, SH_1 for the additional pair P_1. Each switch of a pair comprises a control input so as to simultaneously set one of them in a conducting state by applying a first control signal C1 at its control input, and the other in an isolating state by applying a second control signal C2, complementary to the first control signal, at its control input.

In order to explain the operation of the converter in FIG. 3, the capacitance of the input group Gin will be denoted by Ce and the capacitance of the output group Gout by Cs.

At the start of the conduction phase of the switches SH and SH_1 of each of the two pairs, the voltage Vce across the terminals of the input capacitance Ce and the voltage Vcs across the terminals of the output capacitance Cs are equal to Vin/2, Ce and Cs having the same value equal to C1.

At the end of the conduction phase, Vce and Vcs are still equal but their values become:

$$Vce = Vcs = \frac{Vin}{2} + \frac{1}{C1} \cdot \frac{Iout}{2} \cdot ton$$

with Iout: current in the load resistance Rout of the converter

Ton: conduction time of SH and SH_1

During the next conduction phase of the switches SB and SB_1 of the two pairs (Toff), the sum of the voltages across the terminals of the capacitances Ce and Cs is brought back to the same value with:

$$Vce = Vcs = \frac{Vin}{2}$$

There is therefore a loss of energy caused by the resisitive re-balancing of the capacitances Ce and Cs via the switches SB and SB_1.

The re-balancing losses increase with the current drawn Iout and with the duty cycle.

These losses are given by the equation (1):

$$P(w) = \frac{Iout^2 \cdot Vout^2}{F \cdot C1 \cdot Vin^2}$$

with:
Vin=32 volts
Vout=5 volts
Iout=10 amps
C1=10 microfarads
F=350 kHz

The losses amount to 1.163 watts for an output power of 50 watts, which is about 2.3% of the output power.

Figure 4:
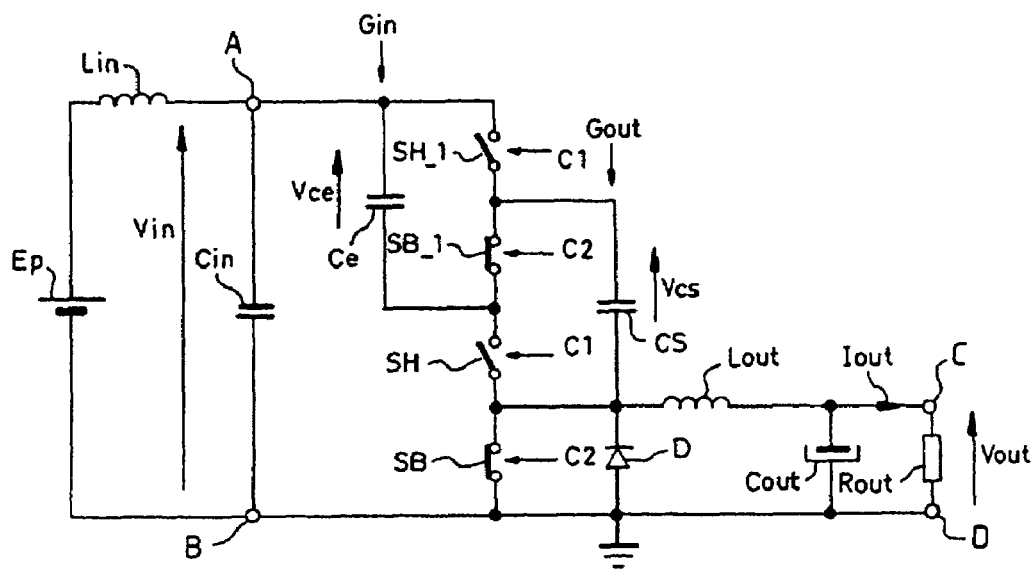
FIG. 4 shows the converter from FIG. 3 in a more realistic configuration.

FIG. 4 shows the converter from FIG. 3 in a more realistic configuration. Indeed, the converter power supply comprises the voltage generator Ep in series with an input inductor Lin, representative of the inductance of the power supply connections, and an input filter capacitor Cin in parallel across the two input terminals A and B of the converter.

In this configuration in FIG. 4, the same rise in the voltages Vce and Vcs on the respective capacitances Ce and Cs is observed during the conduction phase of the switches SH and SH_1, with in addition a decrease in the voltage across the terminals of the input capacitor Cin of:

$$\Delta Vcin = -\frac{Iout}{Cin} \cdot ton$$

During the closed phase of SB and SB_1, there is also a resistive (and hence dissipative) re-balancing of Cin, Ce and Cs.

The re-balancing losses in the case of the more realistic converter in FIG. 4 are given by the equation (2):

$$P(w) = \frac{F}{2} \cdot \left[ Cin \cdot \left( Vin - \frac{2 \cdot Iout \cdot Vout}{F \cdot Cin \cdot Vin} \right)^2 + \frac{C1}{2} \cdot \left( Vin - \frac{2 \cdot Iout \cdot Vout}{F \cdot C1 \cdot Vin} \right)^2 - \left( Cin + \frac{C1}{2} \right) \cdot \left( Vin - \frac{2 \cdot Iout \cdot Vout}{F \cdot Cin \cdot Vin} + \frac{C1 + Cin}{2 \cdot Cin + C1} \cdot \frac{2 \cdot Iout \cdot Vout}{F \cdot Cin \cdot Vin} \right)^2 \right]$$

with:
Vin=32 volts
Vout=5 volts
I out=10 amps
Cin=6 microfarads
C1=6 microfarads
F=350 kHz The losses amount to 3.1 watts for an output power of 50 watts, which is 6.2% of the output power, hence a loss that is three times higher than in the case of the circuit with ideal power supply in FIG. 3.

It will be noted that the limit of this equation (2) when Cin tends to infinity is the equation of an ideal input voltage Vin. In practice, it is the size and the cost of the input filter capacitor Cin that are the limiting factors. In a practical system, there will essentially be a loss three times as high as in the theoretical case shown in FIG. 3.

This result with K=1 may be generalized to converters comprising more than one additional pair.

Figure 5:
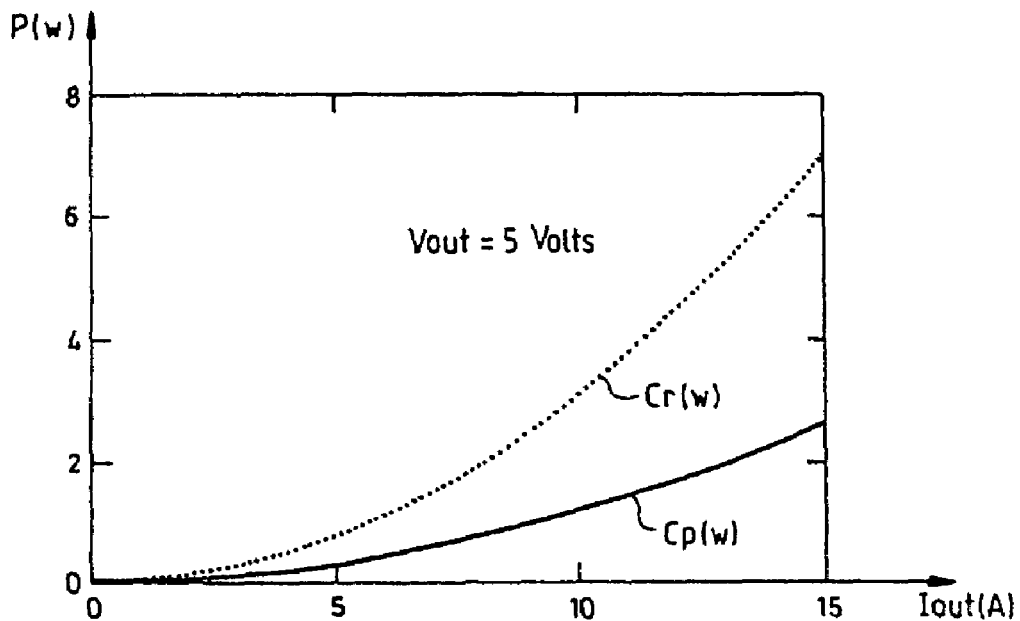
FIG. 5 shows the losses in watts in the case of the converter in FIG. 3 supplied by an ideal voltage source and by a real source.

FIG. 5 shows the losses P(w) in watts as a function of the output current Iout in the load Rout for a voltage Vout of 5 volts.

The curve Cp(w) in FIG. 5 shows the losses in watts in the case of the converter in FIG. 3 supplied by an ideal voltage source. The curve Cr(w) in the same FIG. 5 shows the losses in watts in the case of the more realistic converter in FIG. 4.

Figure 7:
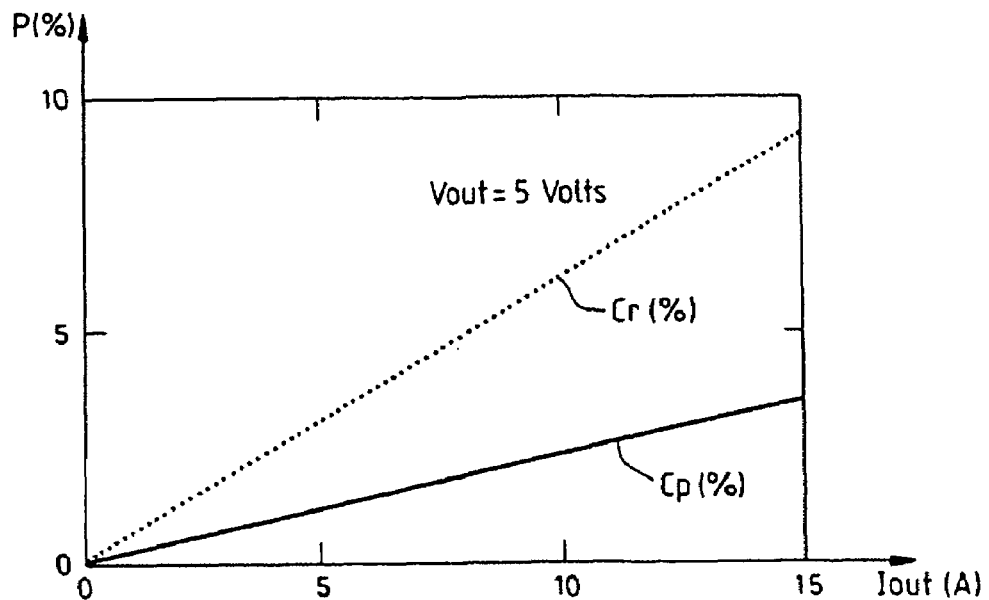
FIG. 7 shows the power loss variations in FIG. 5 expressed as a percentage of the power delivered by the converter.

FIG. 7 shows the variations in the power losses in FIG. 5 expressed as a percentage of the power delivered by the converter. Curves Cp(%) and Cr(%).

In the case of FIGS. 5 and 7, the losses P(w) are calculated for the following parameter values:

Vin=32 volts
Vout=5 volts
Iout=10 amps
Cin=6 microfarads
C1=6 microfarads
F=350 kHz, F being the chopping frequency of the converter.

Figure 6:
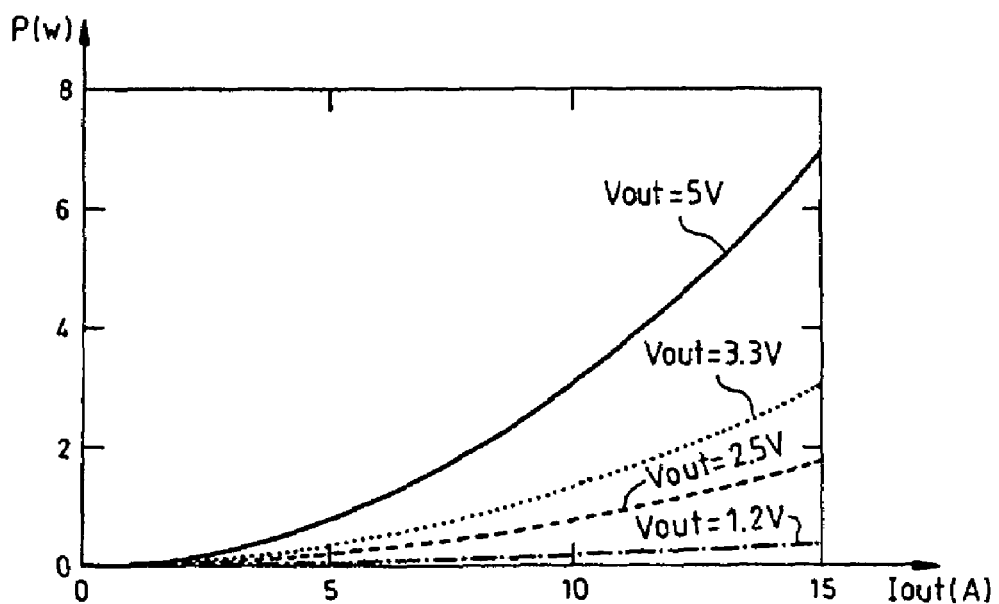
FIG. 6 shows the curves of the losses in watts for various output voltages Vout of the converter in FIG. 4.

FIG. 6 shows the curves of the losses P(w) in watts for various output voltages Vout of the more realistic converter in FIG. 4, the other parameters being identical to those of the embodiment in FIG. 3.

Figure 8:
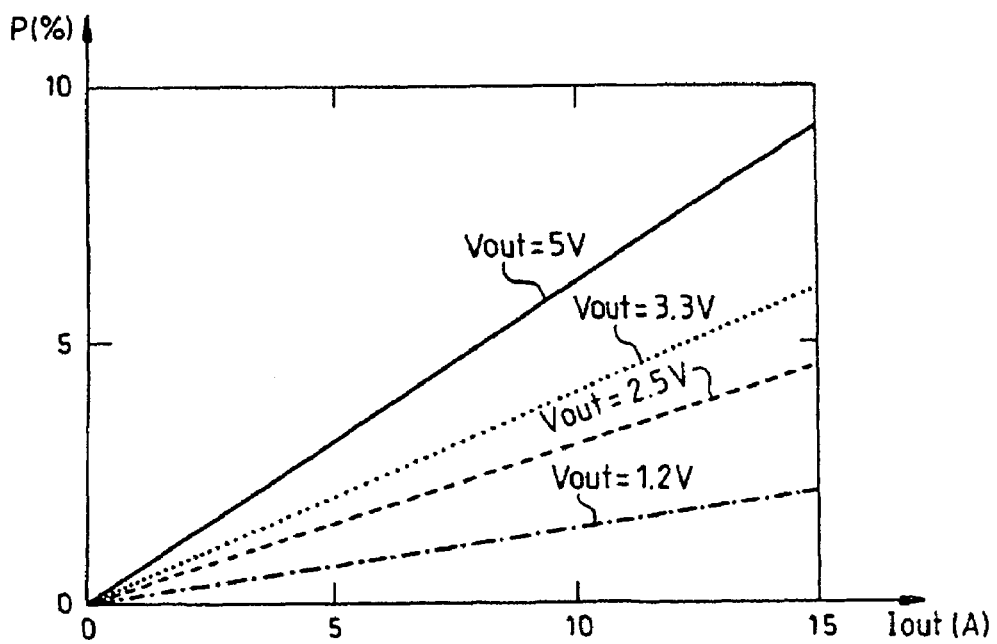
FIG. 8 shows the power loss variations in FIG. 6 expressed as a percentage of the power delivered by the converter.

FIG. 8 shows the variations in power losses in FIG. 6 expressed as a percentage of the power delivered by the converter.

Figure 9A:
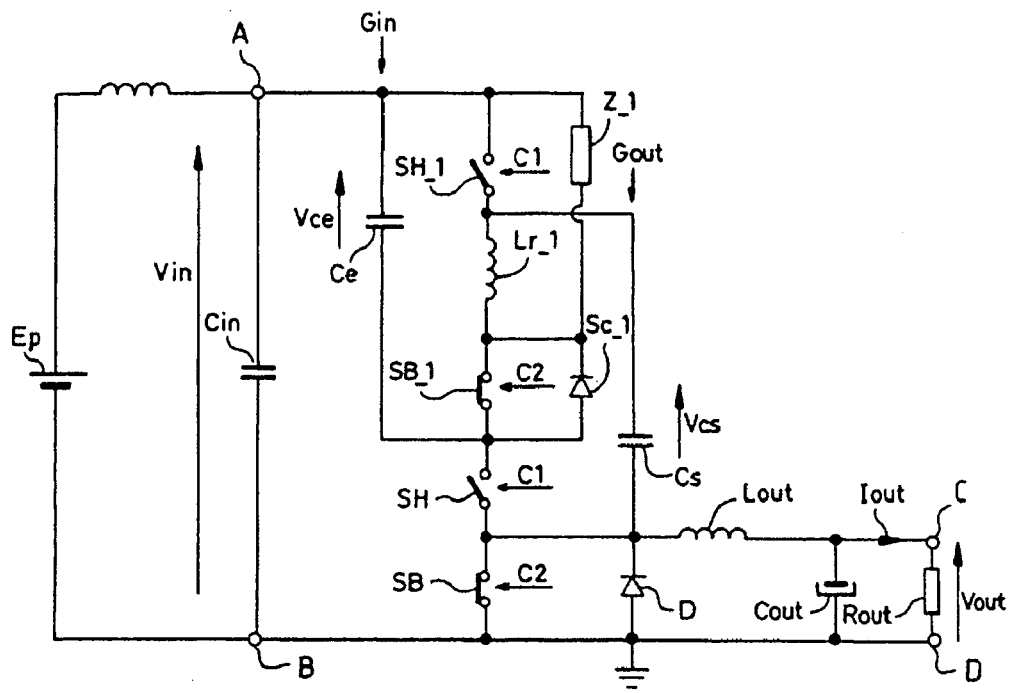
FIG. 9a shows a converter according to the invention in a structure comprising two pairs of switches and in the more realistic configuration of FIG. 4.

FIG. 9a shows a converter according to the invention in a structure comprising two pairs of switches and in the more realistic configuration of FIG. 4 for the power supply. The power supply, delivering the supply voltage Vin of the converter, comprises the voltage generator Ep in series with the input inductor Lin and the filter capacitor Cin in parallel between the two input terminals A and B of the converter.

The converter in FIG. 9a comprises the pair P_0 having the two switches SB and SH connected in series and the additional pair P_1 having the two switches SB_1 and SH_1 connected in series via an energy recovery inductor Lr_1.

In the following, the operation of the buck converter in FIG. 9a according to the invention will be explained.

Figure 10:
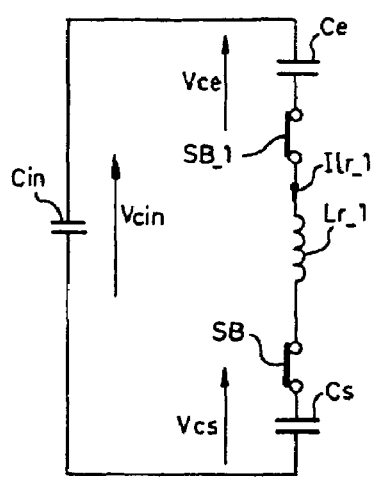
FIG. 10 shows an equivalent circuit diagram of the converter in FIG. 9a according to the invention during the period Toff.

FIG. 10 shows an equivalent circuit diagram of the converter in FIG. 9a according to the invention during the period Toff, corresponding to the conduction period of the switches of the two pairs SB and SB_1. During this time Toff, the switches SB and SB_1 are closed, the switches SH and SH_1 are open, the input capacitor Cin is in parallel with the two capacitances Ce and Cs which are in series with the recovery inductor Lr_1.

The recovery inductor Lr_1 is calculated so as to obtain a resonance of the oscillating circuit in FIG. 10 such that:

$$Toff = \pi \sqrt{L\_1 \cdot Ceq}$$

with $$Ceq = \frac{1}{\frac{1}{Cin} + \frac{1}{Ce} + \frac{1}{Cs}}$$

It is considered that Toff is constant and equal to around the half-period of the resonance frequency of the equivalent circuit in FIG. 10.

Figure 11:
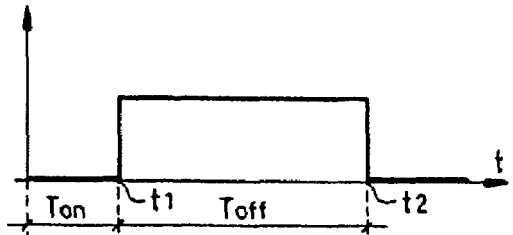
FIG. 11 shows the control signals of the switches of the converter in FIG. 9a during the times Toff and Ton.

FIG. 11 shows the control signals of the switches of the converter in FIG. 9a during the times Toff and Ton.

Figure 12:
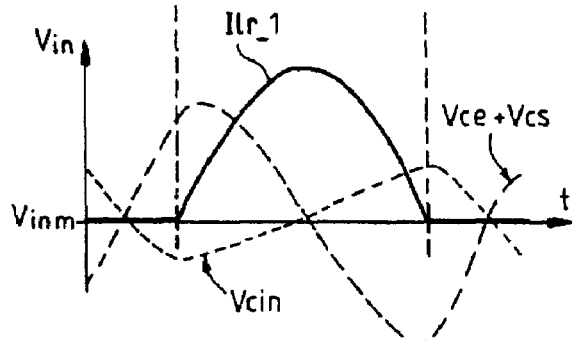
FIG. 12 shows, during the time Toff, the variation of the current Ilr_1 in the energy recovery inductor Lr_1.

FIG. 12 shows, over the time Toff, the variation of the current Ilr_1 in the energy recovery inductor Lr_1 together with the sum of the voltages (Vce+Vcs) across the terminals of the respective capacitances Ce and Cs.

At time t1, when going from Ton to Toff, the current in the inductor is zero, the voltage (Vce+Vcs) across the terminals of the capacitances Ce and Cs is higher than the mean value Vinm of Vin and decreases through the mean value of Vin, the current in the inductor increases while storing magnetic energy, goes through a maximum value when (Vce+Vcs) goes through the mean value of Vin, then the current decreases down to a value of zero, corresponding to the end of Toff, returning the energy to the capacitances Ce and Cs. The current in the inductor becomes zero, the sum of the voltages (Vce+Vcs) increases, during the time Ton, to above the mean value of Vin, then the cycle commences again at the start of Toff.

Figure 13:
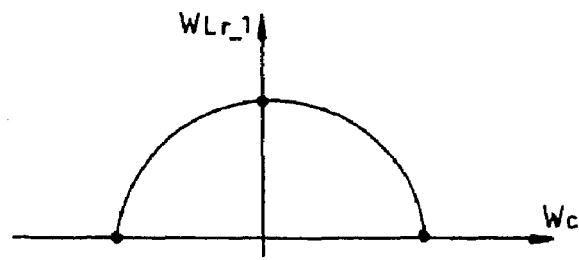
FIG. 13 represents energy space showing the energy in the recovery inductor Lr_1 versus that in the capacitances Ce, Cs of the converter.

FIG. 13 represents energy space showing the energy in the recovery inductor Lr_1 versus that in the capacitances Ce, Cs of the converter. The abscissa represents the capacitance energy Wc, the ordinate the energy in the inductor Wlr_1, the energy variation between the inductor and the capacitances taking place in the time Toff. During this phase Toff, the variation of the energy in the capacitances and in the inductor produces a small variation in the mean value of the voltage Vin. The energy is transferred from the capacitances toward the recovery inductor then returned to the capacitances.

The tuning of the converter circuit at the frequency of operation with the recovery inductor Lr_1 considerably reduces the resistive losses in the buck converter circuit according to the invention. These losses then become practically zero.

Figure 14:
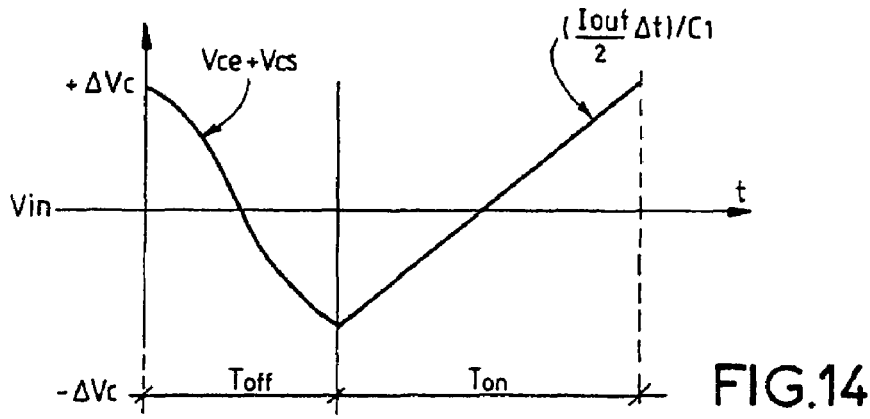
FIG. 14 shows the variation of the value of the voltage Vin across the terminals of the converter according to the invention.

FIG. 14 shows the variation in the value of the voltage Vin across the terminals of the converter according to the invention.

During the time Toff, the voltage Vin varies according to (Vcs+Vce), from $+\Delta v$ to $-\Delta v$, then during Ton the voltage varies from $-\Delta v$ to $\Delta v$ as a function of the output current Iout; this variation is given by the equation (3):

$$\frac{Iout}{2} \cdot \frac{dt}{Cl}$$

In addition, in order to make the converter according to the invention more reliable, the buck converter shown in FIG. 9a comprises, in parallel with the pair P_1, a diode Sc_1 in series with an impedance Z_1, the anode of the diode Sc_1 being connected to the connection point between the pair P_1 and the lower pair P_0, the common point between the cathode of the diode Sc_1 and the impedance Z_1 being connected to the connection point between the switch SB_1 and the recovery inductor Lr_1.

Indeed, in practice, the Toff does not perfectly represent the resonance half-period of the equivalent circuit in FIG. 10, and the impedance Z1 allows the residual current to be dissipated and the switches, which are generally MOS transistors, to be protected. The diode Sc_1 is a 'flywheel' diode.

This improvement of the converter in FIG. 9a is applicable in the general case, where each additional pair P_i of the converter according to the invention comprises, in parallel, a diode Sc_i in series with an impedance Z_i, the anode of the diode Sc_i being connected to the connection point between the pair P_i and the lower pair P_i−1, the common point between the cathode of the diode Sc_i and the impedance Z_i being connected to the common point between the switch SB_i and the recovery inductor Lr_i.

Figure 9B:
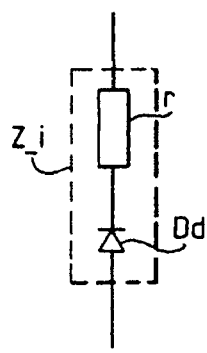
FIG. 9b shows a diode Dd in series with a resistor r, the anode of the diode Dd being connected, in the converter circuit, to the cathode of the diode Sc_i.
Figure 9C:
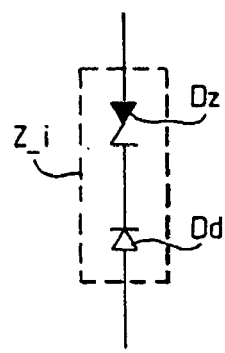
FIG. 9c, shows the impedance Z_i comprising the diode Dd in series with a zener diode Dz, the two cathodes of the diode Dd and the zener diode Dz being connected together, the anode of the diode Dd being connected, in the converter circuit, to the cathode of the diode Sc_i.

The impedance Z_i comprises, in a first version shown in FIG. 9b, a diode Dd in series with a resistor r, the anode of the diode Dd being connected, in the converter circuit, to the cathode of the diode Sc_i and, in a second version shown in FIG. 9c, the impedance Z_i comprises the diode Dd in series with a zener diode Dz, the two cathodes of the diode Dd and the zener diode Dz being connected together, the anode of the diode Dd being connected, in the converter circuit, to the cathode of the diode Sc_i.

The 'flywheel' diodes Sc_1, . . . Sc_i, the diode D ensuring the current continuity in the output inductor Lout and the diodes Dd of the impedances Z_i can, for certain embodiments of the converter, be silicon diodes and, for other embodiments, Schottky diodes.

The explanation of the operation of the buck converter comprising the recovery inductor Lr_1 with two pairs (K=1) remains valid for any number of K additional pairs. Indeed, since the number of elementary capacitors C in the groups connected in series by the switches are the same, the currents in the various pairs P_i and in the corresponding recovery inductor Lr_i are the same.

This general structure shown in FIG. 2 allows various other practical structures to be formed simply and the value of the capacitors in each input or output branch to be determined directly.

Indeed, as has been stated previously, in the general structure in FIG. 2 comprising capacitors C of the same value, the voltages Vc across the terminals of each of the capacitors are the same for the input groups and the same for the output groups, and consequently, the capacitors of the same potential level can, either in part or as a whole, be connected in parallel.

The capacitors of the same potential level Nin_1 are, for example, all those of the input groups Gin_1, Gin_2, . . . Gin_i . . . Gin_K−1, Gin_K having one electrode connected to the input terminal A, of a potential level Nin_2, all those connected by one electrode to the free electrodes of the capacitors of the level Nin_1 and by the other electrode to those of the next level Nin_3, and so on up to the level Nin_K.

Similarly, for the capacitors of the output groups, there will be the level Nout_1 for all those of the output groups Gout_1, Gout_2, . . . Gout_i, . . . Gout_K−1, Gout_K connected to the common point between the two switches of the pair P_0, of a potential level Nout_2 all those connected by one electrode to the free electrodes of the capacitors of the level Nout_1 and by the other electrode to those of the next level Nout_3, and so on up to the level Nout_K.

The dashed lines on the circuit diagram in FIG. 2 represent the possible connections between the capacitors C of the same value.

Figure 15:
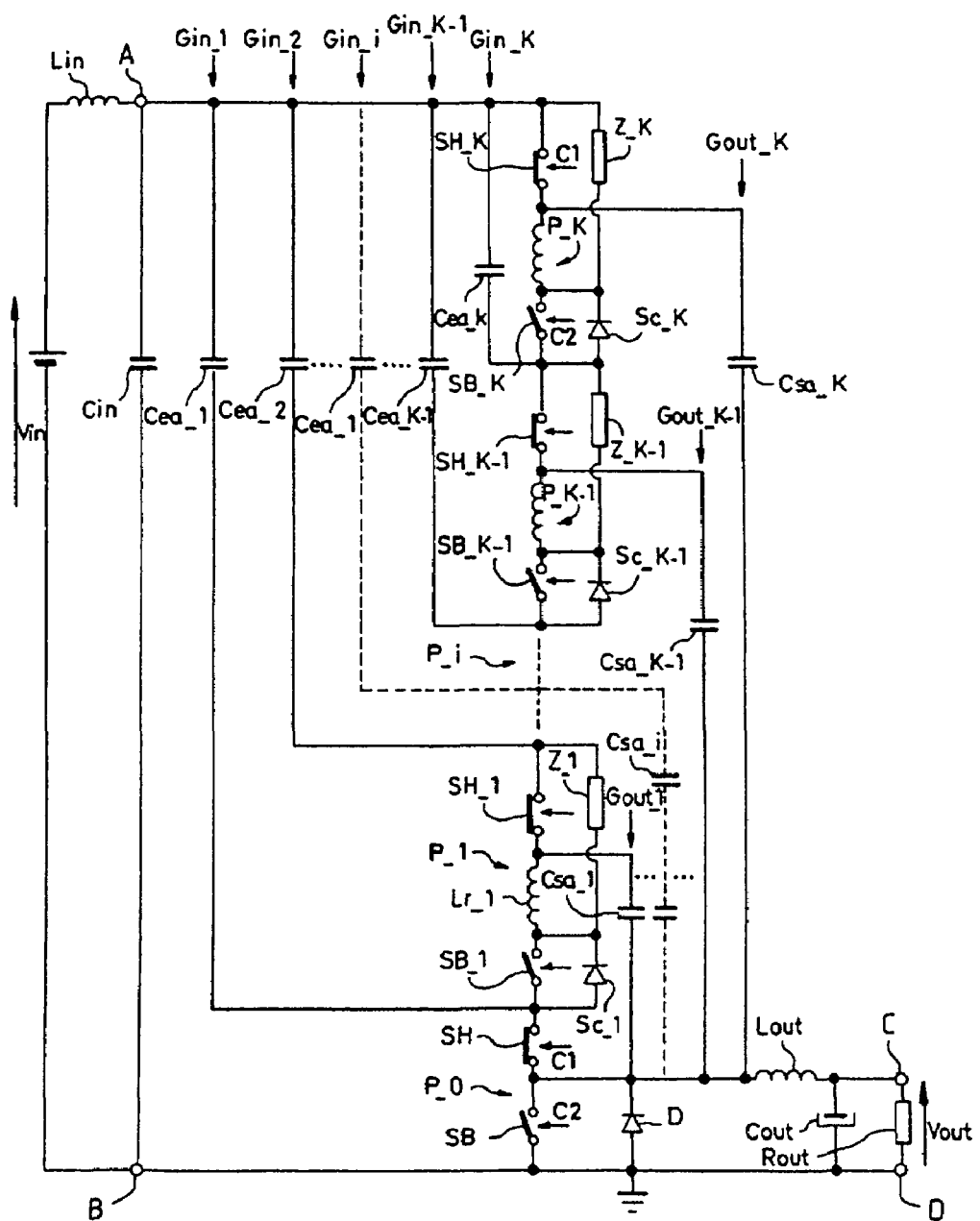
FIGS. 15 and 16 show two practical structures of the buck converter according to the invention.

In a first practical structure, shown in FIG. 15, not comprising interconnections between the capacitors of the same potential level, each of the input groups Gin_i or output groups Gout_i respectively comprises a single capacitance Cea_1, Cea_2; . . . Cea_i . . . Cea_K for the input group Gin_i and Csa_1, Csa_2; . . . Csa_i . . . Csa_K for the output groups Gout_i. The value of each of these input capacitances Cea_i can be simply deduced from the general structure by the calculation of the resultant capacitance of Ni=(K+1)−i capacitors C in series, with i=1, 2, . . . K, i being the order of the input group in question:

$$Cea\_1 = C/K \qquad i = 1$$
$$Cea\_2 = C/(K-1) \qquad i = 2$$
$$\ldots$$
$$Cea\_i = C/((K+1)-i) \qquad i$$
$$\ldots$$
$$Cea\_K = C \qquad i = K$$

The value of each of these output capacitances Csa_i can be simply deduced from the general structure by the calculation of the resultant capacitance of Mi=i capacitors C in series, i being the order of the output group in question:

$$Csa\_1 = C \qquad i = 1$$
$$Csa\_2 = C/2 \qquad i = 2$$
$$\ldots$$
$$Csa\_i = C/i \qquad i$$
$$\ldots$$
$$Csa\_K = C/K \qquad i = K$$

Figure 16:
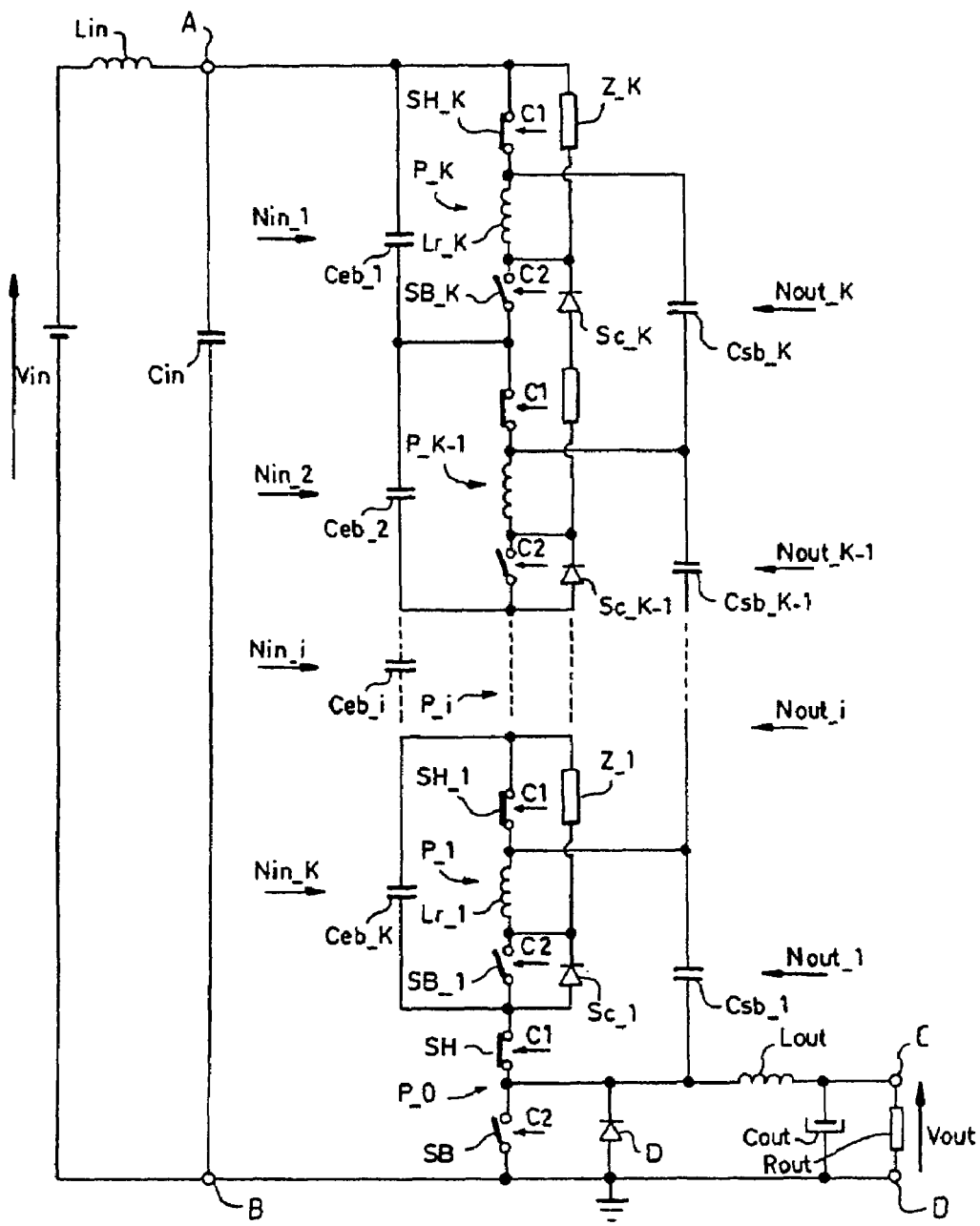

In a second practical structure shown in FIG. 16 comprising the interconnections between the capacitors of the same potential level Nv (capacitors in parallel), the structure comprises a single input group Gin and a single output group Gout. The input capacitance of each of the potential levels Nin_i, i being the order of the potential level in question at the input, in parallel with its respective pair P_i will be simply deduced by calculating the capacitance Ceb_i equivalent to the capacitors in parallel of the level Nin_i in question, which is:

$$Ceb\_1 = C.K \qquad i = 1$$
$$Ceb\_2 = C.(K-1) \qquad i = 2$$
$$\ldots$$
$$Ceb\_i = C.((K+1)-i) \qquad i$$
$$\ldots$$
$$Ceb\_K = C \qquad i = K$$

The output capacitance of each of the potential levels Nout_i, in parallel between two consecutive pairs pair P_i, P_i−1, will be simply deduced by calculating the capacitance Csb_i equivalent to the capacitors in parallel of the level Nout_i in question, i being the order of the output potential level in question, which is:

$$Csb\_1 = C.K \qquad i = 1$$
$$Csb\_2 = C.(K-1) \qquad i = 2$$
$$\ldots$$
$$Csb\_i = C.((K+1)-i) \qquad i$$
$$\ldots$$
$$Csb\_K = C \qquad i = K$$

In other embodiments, the two types of practical embodiments may of course be combined by putting capacitors in parallel for certain groups and in series for others.

Figure 17:
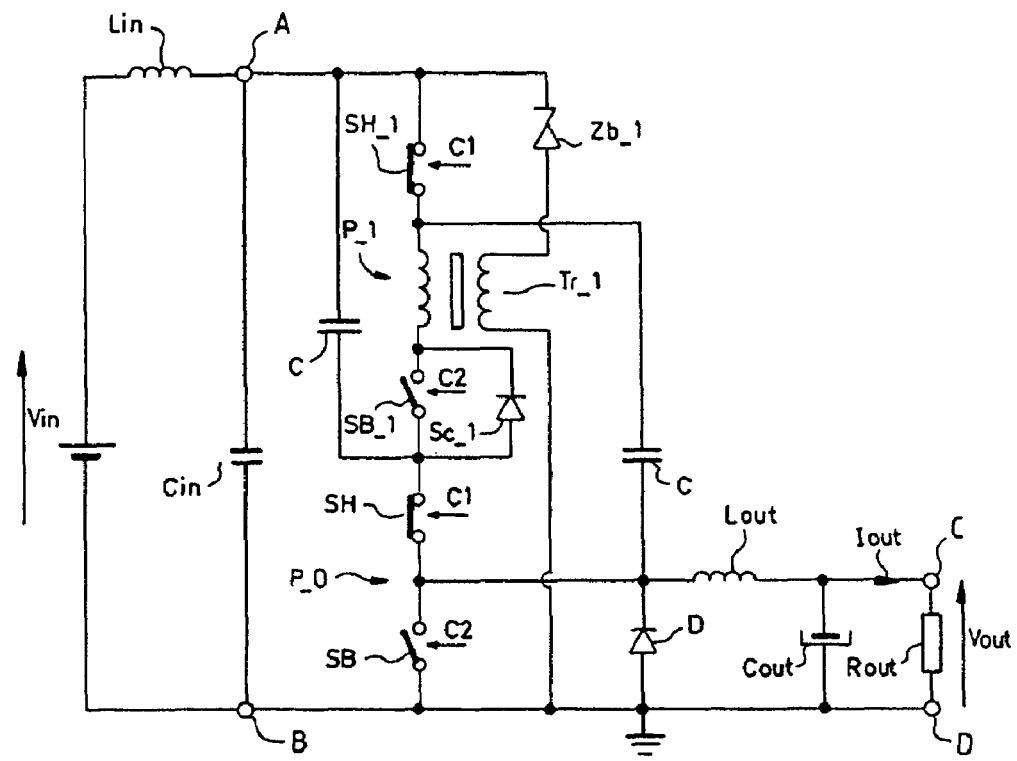
FIG. 17 shows a variant of the buck converter in FIG. 9a according to the invention.

FIG. 17 shows a variant of the buck converter in FIG. 9a according to the invention. In this variant, the recovery inductor Lr_1 is replaced by a transformer Tr_1 whose primary is connected in place of the recovery inductor between the two switches of the first additional pair P_1, the secondary being connected, at one end, to the terminals B and D of the converter and, at the other end, to the input terminal A via a zener diode Zb_1 whose cathode is connected to said input terminal A.

In this variant, the transfer of energy stored in the inductance of the transformer Tr_1 occurs toward the power supply source (capacitor Cin) and not toward the link capacitors C as in the case of the embodiment in FIG. 9a.

In a general case, the embodiment in FIG. 17 is applicable to a converter comprising more than one additional pair; the converter then comprises K recovery transformers, the primary of a transformer of order Tr_i being connected between the two switches of the additional pair P_i, the secondary being connected, at one end, to the terminals B and D of the converter and, at the other end, to the input terminal A via a zener diode Zb_i whose cathode is connected to said input terminal A.

In another variant, the transfer of energy stored in the recovery inductor occurs toward the output load Rout; the converter according to the invention comprises K recovery transformers, the primary of a transformer of order Tr_i being connected between the two switches of the additional pair P_i, the secondary being connected, at one end, to the terminals B and D of the converter and, at the other end, to the output resistance Rout via a zener diode Zb_i whose cathode is connected to said output resistance, the transfer of energy stored in the recovery inductor occurring toward the output load Rout.

The buck converter according to the invention allows efficiencies that are significantly higher than the efficiencies of the converters of the prior art to be obtained with voltage ratios Vout/Vin less than 1/10. In practice, efficiencies better by around 6% with respect to the prior art buck converter are obtained with structures that are adaptable to the various industrial cases and are simple to implement.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A buck converter comprising:
a pair of input terminals A and B for connecting an input DC voltage Vin across these two terminals, the potential of the terminal A being higher than the potential of the terminal B;
a pair P_0 of switches SB, SH in series and connected to the input terminal B by the switch SB, each switch SB, SH comprising a control input so that, simultaneously, one is set in a conducting state by the application of a first control signal at its control input, and the other in an isolating state by the application of a second control signal, complementary to the first control signal, at its control input;
a pair of output terminals C and D for supplying a load Rout with an output voltage Vout, the output terminal D being connected to the input terminal B and the output terminal C to the connection point between the two switches SB and SH in series via a filter inductor Lout, characterized in that it comprises:

K other additional pairs of switches in series between the input terminal A and the switch SH of the pair the two switches of the same additional pair P_i being connected in series via an energy recovery inductor Lr_i;
K input groups, capacitors C in series, each of the same value, with i=1, 2, . . . K−1, K and Ni=(K+1)−i, the electrode of the capacitors of one of the two ends of each input group being connected to the input terminal A, at least the electrode of the capacitors of each of the other ends of the input groups being connected to the connection point between two pairs of consecutive switches P_(i−1) and P_i, respectively;
K output groups, Gout_1, Gout_2, . . . Gout_i, . . . Gout_K−1, Gout_K, of Mi capacitors C in series, each of the same value, with i=1, 2, K and Mi=i, the electrode of the capacitors of one of the two ends of each output group Gout_1, Gout_2, . . . Gout_i, . . . Gout_K−1, Gout_K being connected to the common point between the two switches of the pair P_0, at least the electrode of the capacitors of each of the other ends of the output groups Gout_1, Gout_2, . . . Gout_i, . . . Gout_K being connected to the common point between each switch SH_i and the recovery inductor Lr_i of the corresponding pair P_i of the same rank i, respectively,
in that the switches of these other K additional pairs are simultaneously controlled by the first and second complementary control signals forming, when the switch SB of the pair P_0 connected to the terminal B is set in the conducting state for a time Toff, a first network of capacitors connected between the terminal A and the terminal B, comprising the groups of input capacitors in series with the groups of output capacitors such that a group of input capacitors Gin_i is in series, via its respective energy recovery inductor Lr_i, with its respective group of output capacitors Gout_i,
and in that, when the switch SB of the pair P_0 connected to the input terminal B is set in the isolating state, SH being set in the conducting state, for a time Ton, these other K pairs of switches form a second network of capacitors, connected between the terminal A and the output filter inductor Lout, comprising the input group Gin_1 in parallel with the output group Gout_K, in parallel with input capacitor groups in series with output capacitor groups such that an input capacitor group Gin_i is in series with an output capacitor group Gout_(i−1).

2. The buck converter as claimed in claim 1, wherein each additional pair P_i of the converter comprises, in parallel, a diode Sc_i in series with an impedance Z_i, the anode of the diode Sc_1 being connected to the connection point between the pair P_i and the lower pair P_i−1, the common point between the cathode of the diode Sc_1 and the impedance Z_i being connected to the common point between the switch SB_i and the recovery inductor Lr_i.

3. The buck converter as claimed in claim 2, wherein the impedance Z_i comprises a diode Dd in series with a resistor r, the anode of the diode Dd being connected, in the converter circuit, to the cathode of the diode Sc_i.

4. The buck converter as claimed in claim 2, wherein the impedance Z_i comprises the diode Dd in series with a zener diode Dz, the two cathodes of the diode Dd and the zener diode Dz being connected together, the anode of the diode Dd being connected, in the converter circuit, to the cathode of the diode Sc_i.

5. The buck converter as claimed in claim 2, wherein it does not comprise interconnections between the capacitors of the same potential level, each of the input groups Gin_i or output groups Gout_i respectively comprising a single capacitance Cea_1, Cea_2; ... Cea_i ... Ce_K for the input group Gin_i and Csa_1, Csa_2; ... Csa_i ... Csa_K for the output groups Gout_i, and in that the value of each of these input capacitances Ce_i can be deduced by the calculation of the resultant capacitance of Ni=(K+1)−i capacitors C in series, with i=1, 2, ... K, i being the order of the input group in question:

$$\begin{aligned} Cea\_1 &= C/K & i &= 1 \\ Cea\_2 &= C/(K-1) & i &= 2 \\ &\cdots \\ Cea\_i &= C/((K+1)-i) & i \\ &\cdots \\ Cea\_K &= C & i &= K \end{aligned}$$

in that value of each of these output capacitances Csa_i can be deduced by the calculation of the resultant capacitance of Mi=i capacitors C in series, i being the order of the output group in question:

$$\begin{aligned} Csa\_1 &= C & i &= 1 \\ Csa\_2 &= C/2 & i &= 2 \\ &\cdots \\ Csa\_i &= C/i & i \\ &\cdots \\ Csa\_K &= C/K & i &= K. \end{aligned}$$

6. The buck converter as claimed in claim 2, wherein it comprises interconnections between the capacitors of the same potential level Nv, the structure comprising a single input group Gin and a single output group Gout, the input capacitance of each of the potential levels Nin_i, i being the order of the potential level in question at the input, in parallel with its respective pair P_i, is deduced by calculating the capacitance Ceb_i equivalent to the capacitors in parallel of the level Nin_i in question, which is:

$$\begin{aligned} Ceb\_1 &= C.K & i &= 1 \\ Ceb\_2 &= C.(K-1) & i &= 2 \\ &\cdots \\ Ceb\_i &= C.((K+1)-i) & i \\ &\cdots \\ Ceb\_K &= C & i &= K \end{aligned}$$

in that the output capacitance of each of the potential levels Nout_i, in parallel between two consecutive pairs pair P_i, P_i−1, is deduced by calculating the capacitance Csb_i equivalent to the capacitors in parallel of the level Nout_i in question, i being the order of the output potential level in question, which is:

$$\begin{aligned} Csb\_1 &= C.K & i &= 1 \\ Csb\_2 &= C.(K-1) & i &= 2 \\ &\cdots \\ Csb\_i &= C.((K+1)-i) & i \\ &\cdots \\ Csb\_K &= C & i &= K. \end{aligned}$$

7. The buck converter as claimed in claim 2, wherein it comprises interconnections between the capacitors of the same potential level Nv, the structure comprising a single input group Gin and a single output group Gout, the input capacitance of each of the potential levels Nin_i, i being the order of the potential level in question at the input, in parallel with its respective pair P_i, is deduced by calculating the capacitance Ceb_i equivalent to the capacitors in parallel of the level Nin_i in question, which is:

$$\begin{aligned} Ceb\_1 &= C.K & i &= 1 \\ Ceb\_2 &= C.(K-1) & i &= 2 \\ &\cdots \\ Ceb\_i &= C.((K+1)-i) & i \\ &\cdots \\ Ceb\_K &= C & i &= K \end{aligned}$$

in that the output capacitance of each of the potential levels Nout_i, in parallel between two consecutive pairs pair P_i, P_i−1, is deduced by calculating the capacitance Csb_i equivalent to the capacitors in parallel of the level Nout_i in question, i being the order of the output potential level in question, which is:

$$\begin{aligned} Csb\_1 &= C.K & i &= 1 \\ Csb\_2 &= C.(K-1) & i &= 2 \\ &\cdots \\ Csb\_i &= C.((K+1)-i) & i \\ &\cdots \\ Csb\_K &= C & i &= K. \end{aligned}$$

8. The buck converter as claimed in claim 2, wherein it comprises K recovery transformers, the primary of a transformer of order Tr_i being connected between the two switches of the additional pair P_i, the secondary being connected, at one end, to the terminals B and D of the converter and, at the other end, to the input terminal A via a zener diode Zb_i whose cathode is connected to said input terminal A.

9. The buck converter as claimed in claim 2, wherein it comprises K recovery transformers, the primary of a transformer of order Tr_i being connected between the two switches of the additional pair P_i, the secondary being connected, at one end, to the terminals B and D of the converter and, at the other end, to the output resistance Rout via a zener diode Zb_i whose cathode is connected to said output resistance, the transfer of energy stored in the inductor occurring toward the output load Rout.

10. The buck converter as claimed in claim 2, wherein it comprises a current return diode D across the terminals of the switch SB whose anode is connected on the side of the terminals B and D, and an output filter capacitor Cout in parallel with the load Rout between the output terminals C and D.

11. The buck converter as claimed in claim 2, wherein the 'flywheel' diodes Sc_. ... Sc_i, the diode D ensuring the current continuity in the output inductor Lout and the diodes Dd of the impedance Z_i are silicon diodes.

12. The buck converter as claimed in claim 2, wherein the 'flywheel' diodes Sc_1, ... Sc_i, the diode D ensuring the current continuity in the output inductor Lout and the diodes Dd of the impedance Z_i are Schottky diodes.

13. The buck converter as claimed in claim 1, wherein it does not comprise interconnections between the capacitors of the same potential level, each of the input groups Gin_i or output groups Gout_i respectively comprising a single capacitance Cea_1, Cea_2; ... Cea_i ... Ce_K for the input group Gin_i and Csa_1, Csa_2; ... Csa_i ... Csa_K for the output groups Gout_i, and in that the value of each of these input capacitances Ce_i can be deduced by the calculation of the resultant capacitance of Ni=(K+1)−i capacitors C in series, with i=1, 2, ... K, i being the order of the input group in question:

$$Cea\_1 = C/K \qquad i = 1$$
$$Cea\_2 = C/(K-1) \qquad i = 2$$
$$...$$
$$Cea\_i = C/((K+1)-i) \qquad i$$
$$...$$
$$Cea\_K = C \qquad i = K$$

in that value of each of these output capacitances Csa_i can be deduced by the calculation of the resultant capacitance of Mi=i capacitors C in series, i being the order of the output group in question:

$$Csa\_1 = C \qquad i = 1$$
$$Csa\_2 = C/2 \qquad i = 2$$
$$...$$
$$Csa\_i = C/i \qquad i$$
$$...$$
$$Csa\_K = C/K \qquad i = K.$$

14. The buck converter as claimed in claim 1, wherein it comprises interconnections between the capacitors of the same potential level Nv, the structure comprising a single input group Gin and a single output group Gout, the input capacitance of each of the potential levels Nin_i, i being the order of the potential level in question at the input, in parallel with its respective pair P_i, is deduced by calculating the capacitance Ceb_i equivalent to the capacitors in parallel of the level Nin_i in question, which is:

$$Ceb\_1 = C.K \qquad i = 1$$
$$Ceb\_2 = C.(K-1) \qquad i = 2$$
$$...$$
$$Ceb\_i = C.((K+1)-i) \qquad i$$
$$...$$
$$Ceb\_K = C \qquad i = K$$

in that the output capacitance of each of the potential levels Nout_i, in parallel between two consecutive pairs pair P_i, P_i−1, is deduced by calculating the capacitance Csb_i equivalent to the capacitors in parallel of the level Nout_i in question, i being the order of the output potential level in question, which is:

$$Csb\_1 = C.K \qquad i = 1$$
$$Csb\_2 = C.(K-1) \qquad i = 2$$
$$...$$
$$Csb\_i = C.((K+1)-i) \qquad i$$
$$...$$
$$Csb\_K = C \qquad i = K.$$

15. The buck converter as claimed in claim 1, wherein it comprises combinations of capacitors in parallel for certain groups and in series for others.

16. The buck converter as claimed in claim 1, wherein it comprises K recovery transformers, the primary of a transformer of order Tr_i being connected between the two switches of the additional pair P_i, the secondary being connected, at one end, to the terminals B and D of the converter and, at the other end, to the input terminal A via a zener diode Zb_i whose cathode is connected to said input terminal A.

17. The buck converter as claimed in claim 1, wherein it comprises K recovery transformers, the primary of a transformer of order Tr_i being connected between the two switches of the additional pair P_i, the secondary being connected, at one end, to the terminals B and D of the converter and, at the other end, to the output resistance Rout via a zener diode Zb_i whose cathode is connected to said output resistance, the transfer of energy stored in the inductor occurring toward the output load Rout.

18. The buck converter as claimed in claim 1, wherein it comprises a current return diode D across the terminals of the switch SB whose anode is connected on the side of the terminals B and D, and an output filter capacitor Cout in parallel with the load Rout between the output terminals C and D.

19. The buck converter as claimed in claim 1, wherein the 'flywheel' diodes Sc_1, ... Sc_i, the diode D ensuring the current continuity in the output inductor Lout and the diodes Dd of the impedance Z_i are silicon diodes.

20. The buck converter as claimed in claim 1, wherein the 'flywheel' diodes Sc_1, ... Sc_i, the diode D ensuring the current continuity in the output inductor Lout and the diodes Dd of the impedance Z_i are Schottky diodes.

* * * * *